United States Patent
Hung et al.

(10) Patent No.: US 8,086,095 B2
(45) Date of Patent: Dec. 27, 2011

(54) AUDIO AND VIDEO APPARATUS AND METHOD FOR CONTROLLING THE SAME

(75) Inventors: Chun-Lung Hung, Tu-Cheng (TW); Tao Wang, Shenzhen (CN); Shi-Ming Zhang, Shenzhen (CN); Wang-Chang Duan, Shenzhen (CN); Wen-Ming Chen, Shenzhen (CN); Pei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 838 days.

(21) Appl. No.: 12/171,251

(22) Filed: Jul. 10, 2008

(65) Prior Publication Data

US 2009/0154900 A1    Jun. 18, 2009

(30) Foreign Application Priority Data

Dec. 14, 2007  (CN) .......................... 2007 1 0203068

(51) Int. Cl.
   *H04N 7/26*    (2006.01)

(52) U.S. Cl. .................... 386/353; 386/239; 386/E5.001

(58) Field of Classification Search .................. 709/211, 709/212, 216, 217, 229; 707/600, 607, 608, 707/609, 687; 386/52, 124, 126, 95, 96
   See application file for complete search history.

(56) References Cited

U.S. PATENT DOCUMENTS

| 4,786,967 | A | 11/1988 | Smith, III et al. | |
|---|---|---|---|---|
| 5,389,963 | A | 2/1995 | Lepley et al. | |
| 7,106,953 | B2 | 9/2006 | Ogata et al. | |
| 2007/0256545 | A1* | 11/2007 | Lee et al. | 84/610 |
| 2008/0138028 | A1* | 6/2008 | Grady et al. | 386/1 |

FOREIGN PATENT DOCUMENTS

| CN | 2722536 Y | 8/2005 |
|---|---|---|
| CN | 1704896 A | 12/2005 |

* cited by examiner

*Primary Examiner* — Vivek Srivastava
*Assistant Examiner* — Nega Woldemariam
(74) *Attorney, Agent, or Firm* — Altis Law Group, Inc.

(57) ABSTRACT

An audio and video (AV) apparatus includes a player module for playing audio and video files, generating audio and video signals, and an internal display and an internal speaker. The AV apparatus further includes: a first switch for generating first instructions; an output module for being externally connected to output the audio and video signals; and a control module connected to the first switch. The control module being configured for disabling the internal display and internal speaker at receiving the first instructions at a situation that the output module is externally connected to output the audio and video signals, and disabling the internal display while keeping the internal speaker enabled at receiving the first instruction at a situation that the output module is not externally connected. A method for controlling the audio and video apparatus is provided as well.

10 Claims, 2 Drawing Sheets

AUDIO AND VIDEO APPARATUS AND METHOD FOR CONTROLLING THE SAME

BACKGROUND

1. Field of the Invention

The present invention generally relates to an audio and video apparatus and a method for controlling the same.

2. Description of Related Art

Audio and video players have been popular in people's daily life. Most audio and video players include internal speakers for reproducing sounds and a display for reproducing images. To provide enhanced audio and video capabilities, external speakers and external displays are provided in some audio and video players.

However, when the audio and video players are connected to the external speakers or displays, the internal speakers and displays may continue to output sound and images, respectively, thus making the internal speakers and display redundant and leading to a waste of electricity or power.

Therefore, improvement for an audio and video apparatus is needed in the industry to address the aforementioned deficiency.

SUMMARY

An audio and video apparatus includes a player module, an internal display, an internal speaker, a first switch, an output module, and a control module. The player module is used for playing audio and video files, and generating audio and video signals. The internal display is used for displaying according to the video signal. The internal speaker is used for playing voice according to the audio signal. The first switch is used for generating first instructions. The output module is used for being externally connected to output the audio and video signals. The control module is connected to the first switch, and is configured for disabling the internal display and internal speaker at receiving the first instructions at a situation that the output module is externally connected to output the audio and video signals, and disabling the internal display while keeping the internal speaker enabled at receiving the first instruction at a situation that the output module is not externally connected.

Other advantages and novel features of the present invention will become more apparent from the following detailed description of preferred embodiment when taken in conjunction with the accompanying drawings.

DETAILED DESCRIPTION OF THE EMBODIMENTS

Reference will now be made to the drawings to describe a preferred embodiment of the present audio and video apparatus.

Figure 1:
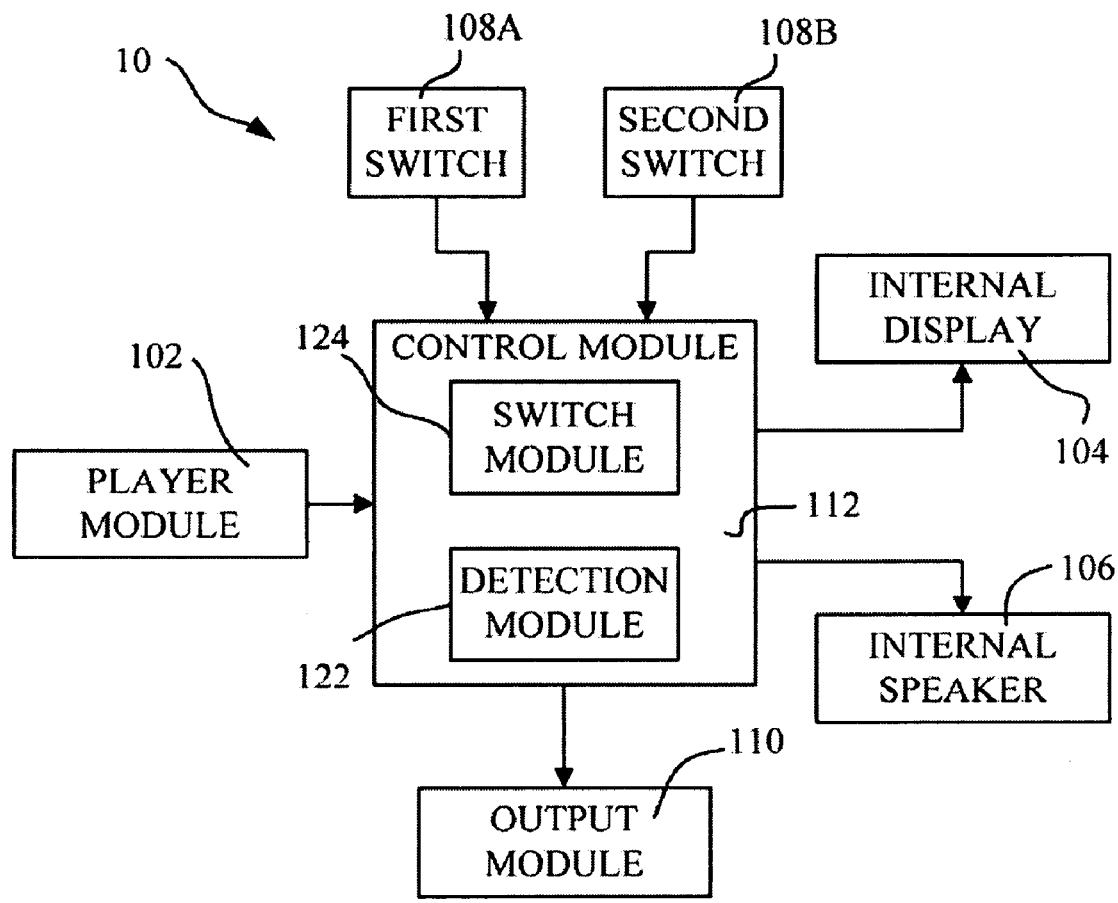
FIG. 1 is a block diagram of an audio and video apparatus in accordance with an exemplary embodiment.

Referring to FIG. 1, an audio and video device includes a player module 102, an internal display 104, an internal speaker 106, first and second switches 108A, 108B, an output module 110, and a control module 112. The audio and video device can be a multimedia player, such as an MP3 player, an MP4 player, a Portable Media Player (PMP), a portable optical disk player, or a portable computing device, such as a mobile phone or a notebook computer.

The player module 102 is used for processing multimedia files and generating audio and video (AV) signals for driving the internal display 104 and the internal speaker 106 to output sounds and images correspondingly. In this embodiment, the player module 102 is a decoder for decoding the multimedia files. The first switch 108A and the second switch 108B are respectively used for generating a first instruction and a second instruction according to operational inputs. The first and second switches 108A, 108B can be mechanical buttons or touch sensors. The output module 110 is used for outputting the AV signals generated by the player module 102 to a connected external device (not shown). The output module 110 can either be an integrated I/O port for outputting both audio and video signals, or separate ports for outputting audio and video signals separately. In this embodiment, only one output module 110 is incorporated here for outputting both the audio signal and the video signal for simplicity, the output module 110 can be configured for transmitting both audio and video signals.

The control module 112 is used for enabling (powering on) and disabling (powering off) the internal display 104 and the internal speaker 106 correspondingly. The control module 112 includes a detection module 122 and a switch module 124. The detection module 122 is used for detecting whether an external device is coupled to the output module 110. The detection module 122 thus determines whether there is a connected external device sending AV output requests for outputting the audio and video signals, and generates a connection status signal. Either one of the external speaker or the external display connected to the control module 112 will trigger the connection status signal to indicate the condition that the connected external device is present (the output module 110 is connected by an external device).

The switch module 124 enables and disables the internal display 104 and the internal speaker 106 correspondingly according to the first instruction, the second instruction, and the connection status signal. In a condition where the connection status signal indicates that the detection module 122 receives the AV output request and the first instruction is received from the first switch 108A, the switch module 124 disables the internal display 104 and the internal speaker 106. In a condition that the connection status signal shows that the external speaker and the external display are connected to the output module 110 and the second instruction is received from the second switch 108B, the switch module 124 disables the internal display 104, while keeping the internal speaker 106 enabled. In a condition that the connection status signal from the detection module 122 shows that the connected external device is not present (neither an external speaker nor a display is connected to the output module 110), and either the first instruction or the second instruction is received, the switch module 124 disables the internal display 104, while keeping the internal speaker 106 enabled.

The internal display 104 and the internal speaker 106 can be disabled in the condition that the presence of the external speakers and displays, which means that the internal display and the internal speaker may not be needed. The internal display 104 can be switched off independently, while keeping the internal speaker 106 working.

Figure 2:
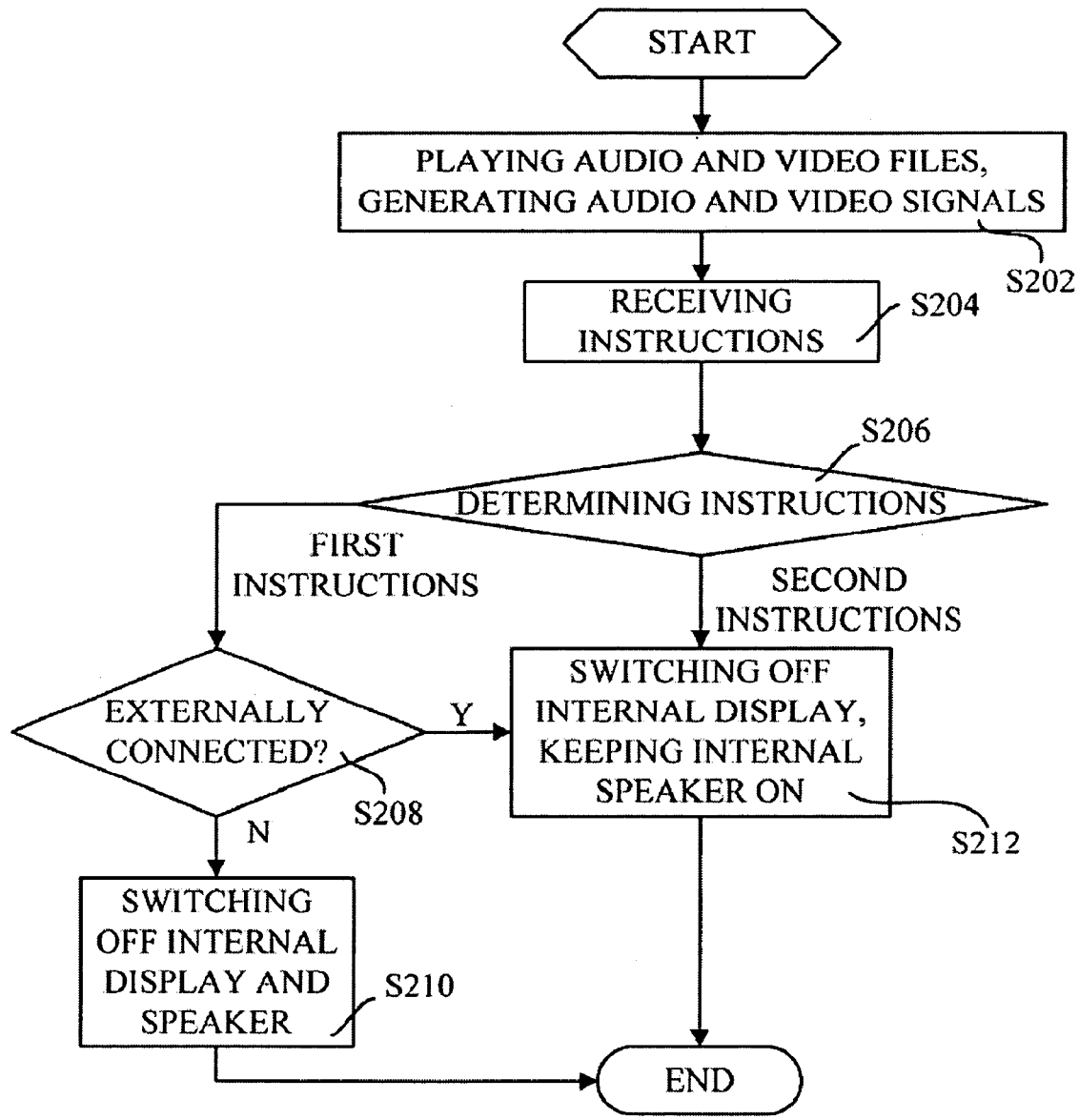
FIG. 2 is a flow chart of a method for controlling the audio and video apparatus in accordance with an exemplary embodiment.

Referring to FIG. 2, a flow chart of a method for controlling the audio and video apparatus in accordance with an exemplary embodiment is illustrated. The method includes following steps:

Step S202, the internal display 104 outputs data images, and the internal speaker 106 outputs sounds.

Step S204, the control module 112 receives instructions from the first or the second switch 108A, 108B. The instructions can be the first instruction or the second instruction for enabling or disabling the internal display 104 and the internal speaker 106 correspondingly.

Step S206, the switch module 124 of the control module 112 determines whether the instruction received is the first or the second instruction.

Step S208, if it is determined in step S206 that the received instruction is the first instruction, the detection module 122 generates the connection status signal indicating whether there is any external display or speaker connected to the output module 110.

Step S210, if it is detected in step S208 that an external speaker or display is present, the switch module 124 disables the internal display 104 and the internal speaker 106.

Step S212, if it is determined in step S206 that the received instruction is the second instruction, or if it is detected in step S208 that no external speaker or display is connected to the output module 110, the switch module 124 disables the internal display 104, while keeping the internal speaker 106 enabled.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An audio and video apparatus comprising:
   a player module for playing audio and video files, and generating audio signals and video signals, respectively;
   an internal display for displaying the video signals;
   an internal speaker for outputting sound waves according to the audio signals;
   a first switch for generating first instructions;
   an output module for outputting the audio and video signals; and
   a control module connected to the first switch, being configured for disabling the internal display and internal speaker at receiving the first instructions in a situation that the output module is externally connected to output the audio and video signals, and disabling the internal display while keeping the internal speaker enabled at receiving the first instructions in a situation that the output module is not externally connected.

2. The apparatus according to claim 1, further comprising a second switch for generating second instructions, the control module further being configured for being connected to the second switch to receive the second instructions, and disabling the internal display while keeping the internal speaker enabled at receiving the second instruction.

3. The apparatus according to claim 2, wherein the control module comprises:
   a detection module for detecting if the output module is externally connected to output the audio and video signals, and generating connection status signals accordingly; and
   a switch module for enabling and/or disabling the internal display and the internal speaker according to the first instructions, the second instructions and the connection status signals.

4. The apparatus according to claim 3, wherein the switch module is configured for
   disabling the internal display and the internal speaker according to the first instruction if the connection status signal shows that the output module is externally connected to output the audio and video signals; or
   disabling the internal display while keeping the internal speaker enabled according to the first instruction if the connection status signal shows that the output module is not externally connected.

5. A method for controlling an audio and video apparatus comprising following steps:
   playing audio and video files, and generating audio and video signals, respectively;
   driving an internal display to show images and an internal speaker to play voices;
   detecting whether the audio and video signals are externally outputted;
   determining whether a first instruction is received;
   disabling the internal display and the internal speaker at receiving the first instruction in a situation that the audio and video signals are externally outputted; and
   disabling the internal display while keeping the internal speaker enabled at receiving the first instruction in a situation that the audio and video signals are not externally outputted.

6. The method according to claim 5, further comprising:
   determining whether a second instruction is received;
   disabling the internal display while keeping the internal speaker enabled at receiving the second instruction.

7. An audio and video apparatus comprising:
   a player module for playing audio and video files, and generating audio signals and video signals, respectively;
   an internal display for displaying the video signals;
   an internal speaker for outputting sound waves according to the audio signals;
   a first switch for generating first instructions;
   an output module capable of being externally connected to an external device and for outputting the audio and video signals; and
   a control module connected to the first switch, being configured for disabling the internal display and internal speaker at receiving the first instructions in a situation that the output module is externally connected to the external device to output the audio and video signals.

8. The apparatus according to claim 7, wherein the control module disables the internal display while keeps the internal speaker enabled at receiving the first instructions in a situation that the output module is not externally connected.

9. The apparatus according to claim 2, wherein the control module comprises:
   a detection module for detecting if the output module is externally connected to output the audio and video signals, and generating connection status signals accordingly; and
   a switch module for enabling and/or disabling the internal display and the internal speaker according to the first instructions, the second instructions and the connection status signals.

10. The apparatus according to claim 9, wherein the switch module is configured for
    disabling the internal display and the internal speaker according to the first instruction if the connection status signal shows that the output module is externally connected to output the audio and video signals; or
    disabling the internal display while keeping the internal speaker enabled according to the first instruction if the connection status signal shows that the output module is not externally connected.

* * * * *